United States Patent

Vezzani

[11] Patent Number: 6,076,361
[45] Date of Patent: Jun. 20, 2000

[54] METHOD AND APPARATUS FOR THE PRODUCTION OF FROZEN, COMPOSITE FOOD PRODUCTS

[75] Inventor: Corrado Vezzani, Milan, Italy

[73] Assignee: Vomm Chemipharma S.R.L., Milan, Italy

[21] Appl. No.: 09/113,299

[22] Filed: Jul. 10, 1998

[51] Int. Cl.⁷ .................................................. F23D 13/06
[52] U.S. Cl. ...................... 62/63; 62/65; 62/75; 426/249; 426/393; 426/526
[58] Field of Search ................................ 62/63, 65, 75; 426/249, 393, 526

[56] References Cited

U.S. PATENT DOCUMENTS

| | | |
|---|---|---|
| 2,484,070 | 10/1949 | Boyce . |
| 3,607,313 | 9/1979 | Roth . |
| 4,265,921 | 5/1981 | Lermueaux . |
| 4,478,861 | 10/1984 | Montgomery et al. . |
| 4,732,013 | 3/1988 | Beck . |
| 5,223,293 | 6/1993 | Bain . |
| 5,494,692 | 2/1996 | Beyer et al. .................................. 62/75 |
| 5,707,448 | 1/1998 | Cordera et al. . |

FOREIGN PATENT DOCUMENTS

| | | |
|---|---|---|
| 0 355 812 A1 | 2/1990 | European Pat. Off. . |
| 0 560 509 A1 | 9/1993 | European Pat. Off. . |
| 2 551 191 A1 | 3/1985 | France . |
| 1110126 | 4/1968 | United Kingdom . |

Primary Examiner—Ronald Capossela
Attorney, Agent, or Firm—Burns Doane Swecker & Mathis L.L.P.

[57] ABSTRACT

In order to produce a frozen, composite food product including at least two components, a continuous flow of pieces of the first component is advanced along a mixing tank in which the pieces are simultaneously tossed and a continuous flow of at least one second component is spread on the first component as it advances through the mixing tank.

5 Claims, 4 Drawing Sheets

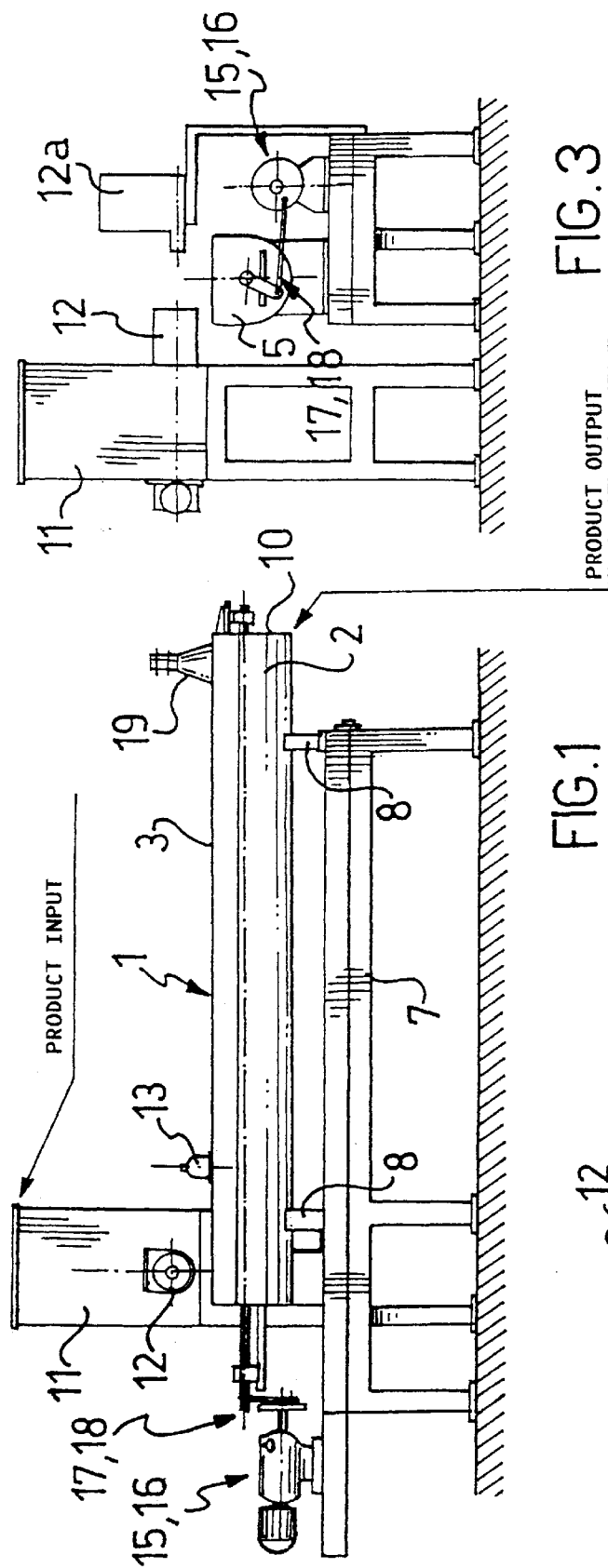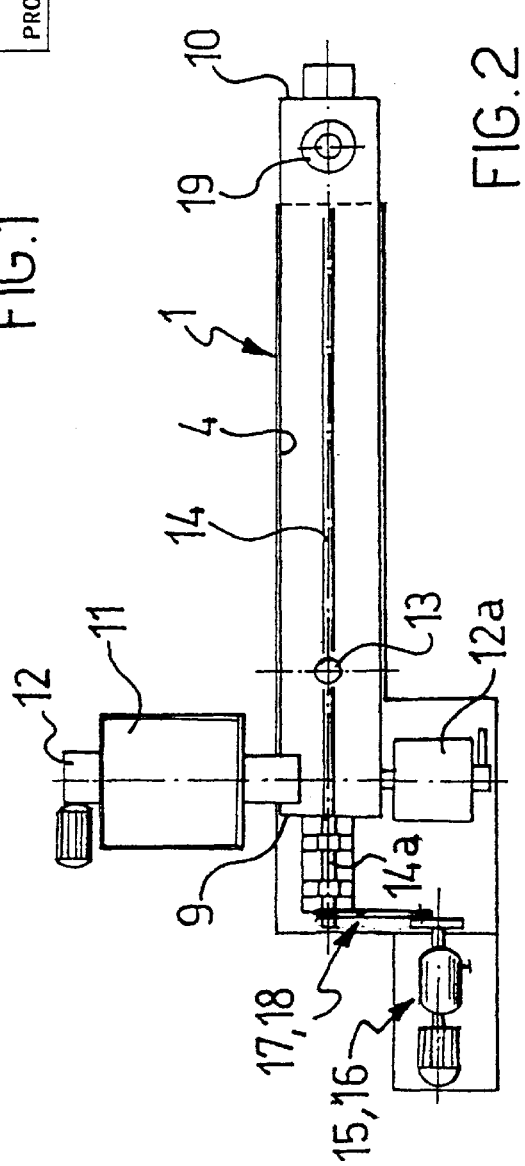

METHOD AND APPARATUS FOR THE PRODUCTION OF FROZEN, COMPOSITE FOOD PRODUCTS

FIELD OF THE INVENTION

The present invention relates in general to a method for the production of frozen, composite food products.

The term "composite food products" is intended to define herein food products comprising two or more components in the same product, that is, products produced by the "combination" of several components which, although structurally and/or physically non-homogeneous, are compatible from an organoleptic point of view, for example, pre-cooked pasta or rice and the respective seasoning/sauce, vegetables in general and batter, fish and batter, fish and flour, and similar culinary "dishes".

BACKGROUND OF THE INVENTION

In the specific case of frozen composite food products, in order to operate on an industrial scale, it is necessary, in order to form the final product, for the said "combination" of two or more pre-selected components to take place after at least the main component has been frozen.

Thus, for example, in the case of pre-cooked pasta seasoned with a pre-selected sauce, the pre-cooked pasta is normally frozen and the individual pieces of pasta are then (ideally) sprinkled with the pre-selected seasoning (sauce) which thus simultaneously freezes thereon.

An ideal sauce/pasta combination is quite difficult to achieve since it is greatly hindered by the objective difficulty of breaking up the mass of pre-cooked and frozen products (the pasta) and by the rate at which the sprinkled component (the sauce) freezes in contact with the products.

The techniques used up to now for achieving the aforementioned object are based fundamentally on an operation known in Italian as "bassinatura", in which continuous mixing of the frozen products is associated with rolling of the products in the surface or upper layers on those of the underlying layers.

Although these techniques are widely used and, in some cases, are even satisfactory, they do not generally enable the sprinkled component to be distributed uniformly on the frozen component, above all, because of the substantial failure to break it up. In many cases, undesired lumps of product are even formed, because of the chemico-physical characteristics of the sprinkled component and because of its spontaneous freezing onto the frozen component.

A further problem of the prior art is connected with the structural and functional complexity of the apparatus used to produce the composite food products in question, its poor reliability in operation, and also the need to use skilled operators for constantly monitoring its operation.

SUMMARY OF THE INVENTION

The problem upon which the present invention is based is that of providing a method of producing frozen composite food products which can overcome the problems mentioned with reference to the prior art.

This problem is solved, according to the invention, by a method for the continuous production of a frozen composite food product including at least two components, characterized in that it comprises the steps of:

advancing a continuous flow of loose pieces of a first, frozen component of the composite product along a mixing tank towards an output end thereof, and simultaneously tossing the pieces of the frozen component which then fall back into the tank, the pieces being in a dispersed condition during the tossing and falling step, spreading on the pieces of frozen component a continuous flow of at least one second component of the composite food product, the second component freezing upon contact with the individual pieces of the frozen first component.

Advantageously, in order to ensure a more uniform distribution of the second component on the individual pieces of the first component of the composite food product in question, the predetermined dose per hour of the second component 1s supplied in two or more independent flows and in two or more successive different positions in the mixing tank.

Moreover, should it be necessary to increase the "speed" of freezing of the second component, one or more successive sprinklings of a refrigerant fluid of the type conventionally used in the food industry (for example, liquid nitrogen or powdered dry ice) may be provided along the mixing tank.

The great advantage achieved by the present invention (the certain and uniform combination of two or more components of the composite food product to be produced) is due, above all, to the fact that, during the tossing and falling step, the pieces of the frozen component are definitely separated and are therefore in a better condition to contact the other components uniformly over their entire surfaces.

The invention also relates to apparatus for implementing the method. The characteristics of this apparatus are set forth in the appended claims relating thereto.

The characteristics and advantages of the invention will become clearer from the description of an embodiment of the method of the invention, given with reference to the appended drawings of apparatus according to the invention, the drawings being provided purely by way of non-limiting example.

BRIEF DESCRIPTION OF THE DRAWINGS

In the drawings:

FIGS. 1 to 3 are schematic front elevational, plan, and side views, respectively, of apparatus according to the invention.

DETAILED DESCRIPTION OF THE INVENTION

Figure 4:
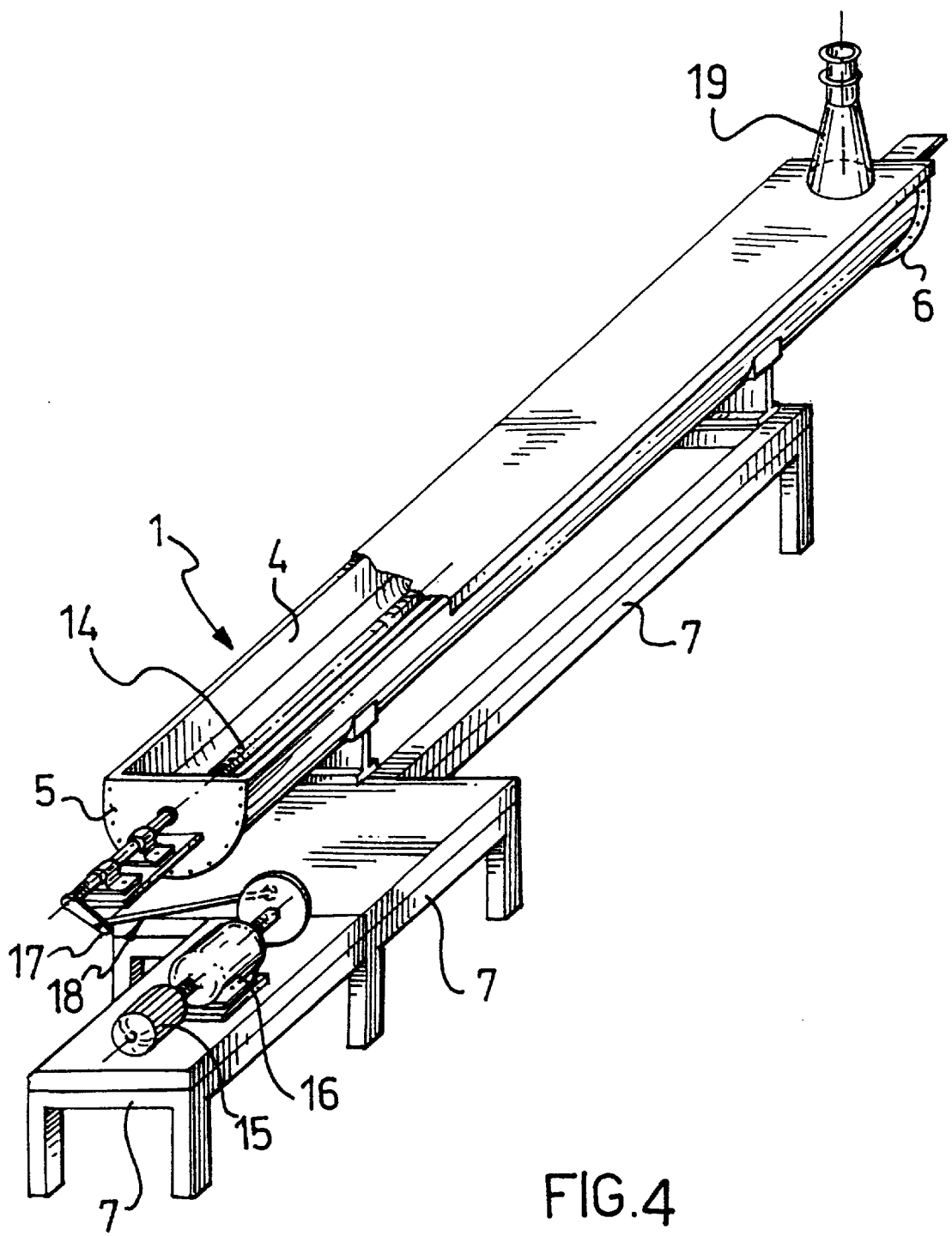
FIG. 4 shows a detail of the apparatus of FIG. 1 in perspective.

With reference to the drawings, apparatus for producing composite, pre-cooked and frozen food products in accordance with the method of the invention comprises a tank 1 for mixing the products, the main body 2 of the tank being shaped as a semi-cylindrical channel with side walls or sides 3, 4 (FIG. 4), and being closed at its opposite ends by respective end walls 5, 6.

The tank 1 is supported by a bench 7, by means of legs/shock-absorbers 8 of adjustable height.

The height of the legs 8 is advantageously selected so as to give the tank 1 a downward inclination from a product-input end 9 towards a treated-product output end 10.

On one side of the tank 1 and in the region of its end 9, the bench 7 supports a reservoir/hopper 11 for the frozen components (for example, frozen pre-cooked pasta) of the composite food product to be produced and a metering feeder 12, for example of the screw type, operates in the hopper. A reservoir/hopper 12a for the remaining components of the composite food product to be produced is supported on the other side of the tank 1 and, beside this reservoir 12a, there is a first unit 13 for supplying a refrigerant fluid permitted in the food industry.

A shaft 14, supported axially for rotation in the tank 1, has one end 14a projecting from the tank and connected to a motor/reduction-gear unit 15–16 by means of a kinematic mechanism with a connecting rod and crank 17–18. At the other end (the treated-product output end 10) there is a hood and a respective extractor 19 for extracting the vapors of the refrigerant fluid used.

Figure 5:
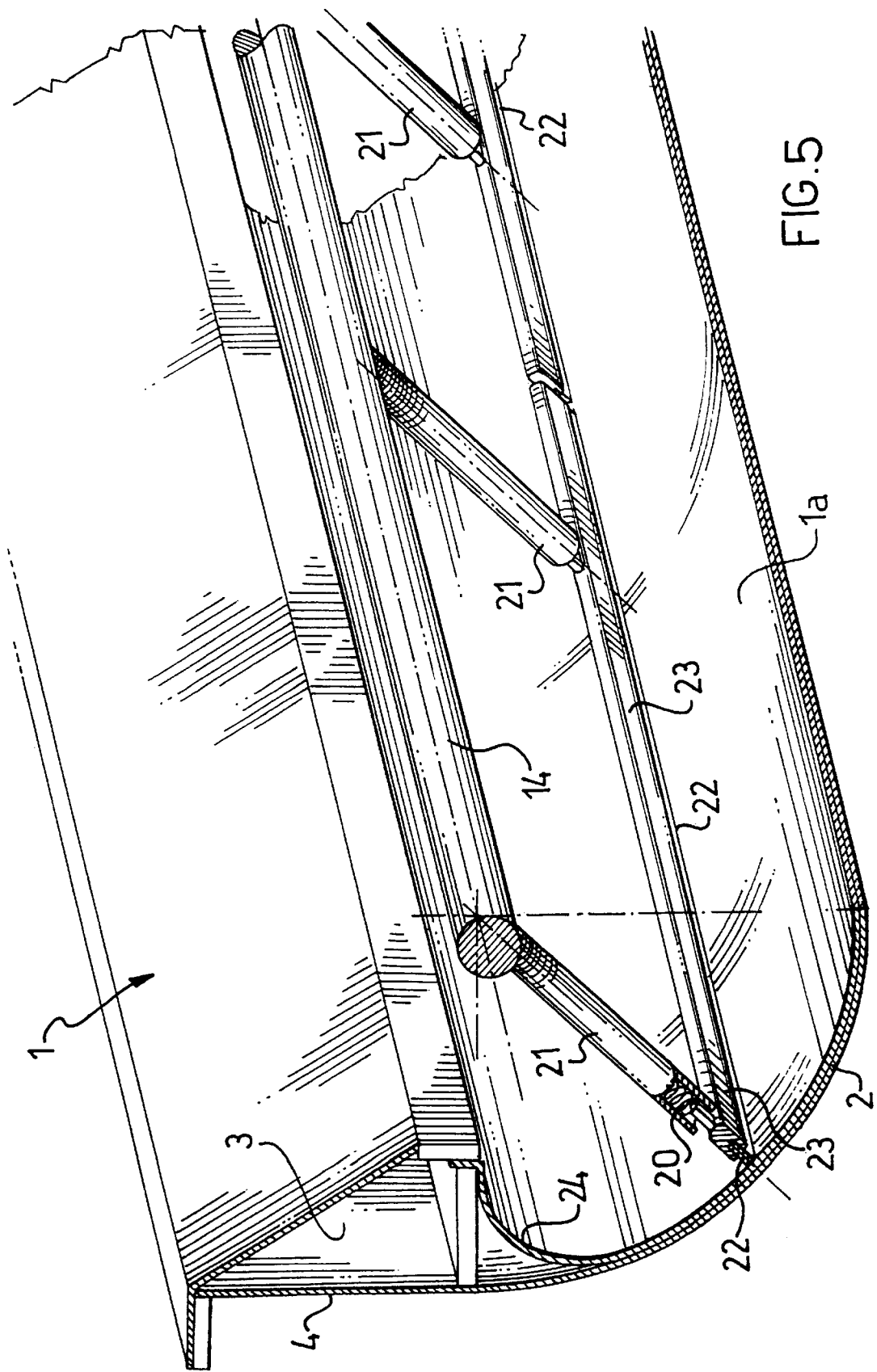
FIG. 5 shows a detail of the apparatus of FIG. 4 on an enlarged scale.

With reference to FIG. 5, a paddle for mixing the products is associated with the shaft 14 and comprises a plurality of arms 21 extending radially from the shaft and a product-mixing blade 22 which is mounted at the ends of the arms 21, extends parallel to the shaft 14, and is kept resiliently in contact with the semi-cylindrical base 1a of the tank 1. For this purpose, the end of each arm 21 is perforated axially for the releasable engagement of a block 23 fixed to the blade 22 and one or more springs 20 of predetermined resilient force.

The blade 22 is advantageously constituted by a plurality of portions arranged end-to-end.

With reference to FIG. 5, the semi-cylindrical tank body 1a has, adjacent and inside the sides 3, 4, respective curved elements 24 which have a radius of curvature smaller than that of the body. The ratio between the radii of curvature is preferably within the range of 1:3–1:5 and, more preferably 1:3.5–1:4.

Naturally, the curved elements 24, which extend along the entire length of the tank 1 with their lower sides connected to body 2 thereof, may advantageously be constituted by suitably curved end portions of the tank body 2. As will become clearer from the following description, the curved elements 24 basically constitute deflectors extending in the region of the opposite edges of the tank body 2 and along the entire length of the tank.

Figure 6:
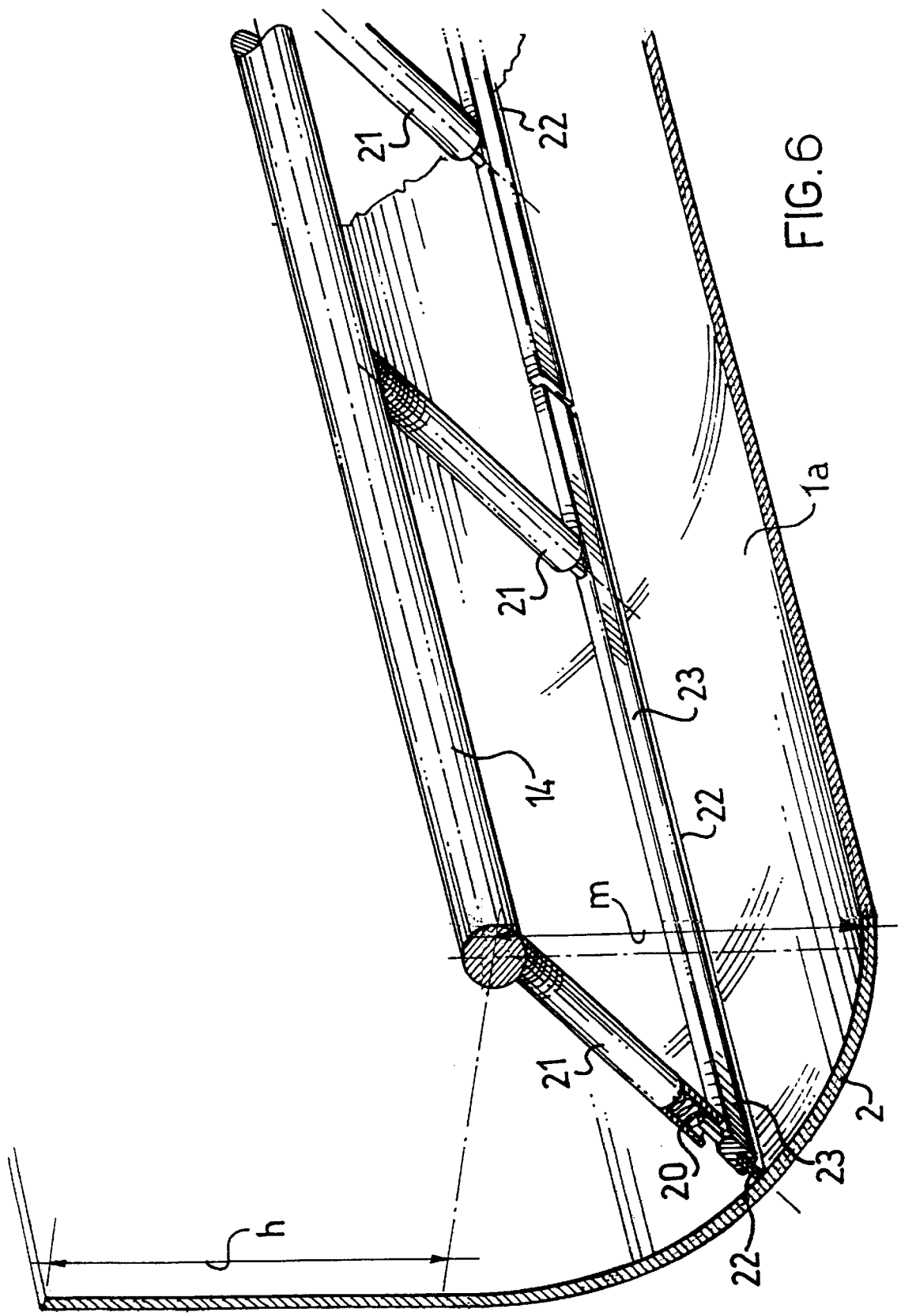
FIG. 6 shows the same detail as FIG. 5, on an enlarged scale, but in accordance with a second embodiment of the apparatus of the present invention.

In a second embodiment of the apparatus according to the present invention, with reference to FIG. 6, the curved elements 24 are omitted and the opposed sides 3, 4 of the tank 1 are advantageously extended substantially vertically to form end portions 26 which extend along the entire length of the tank.

The height h of these end portions 26 is such as to contain the mass of loose pieces thrust upwards by oscillatory motion of the blade 22, as will be described below.

With the use of the apparatus described above, the method of the present invention is implemented in the following manner.

The blade 22 is set in reciprocating oscillatory motion and two independent flows of pieces of a frozen component (for example frozen pre-cooked pasta) and of a second component (for example, a tomato-based sauce) which are to be combined to form the desired frozen composite food product, are simultaneously supplied into the tank 1 from the reservoirs 11 and 12.

Upon contact with the frozen pieces of the first component, the second component starts to freeze thereon, and is anchored gradually more firmly to the surface thereof.

Should it be necessary, for operative reasons, to increase the rate of cooling of the second component, there is provision for a supply (continuous or intermittent) of refrigerant fluid from the reservoir 13.

The first component tends to collect on the bottom 1a of the tank 1 and, because of the inclination of the tank, to move towards the output end 10.

During this movement and as soon as it starts to accumulate on the bottom of the tank 1, the mass of non-coherent (loose) pieces of the first component is "picked up" by the mixing blade 22, by which it is thrust upwards (first on one side and then on the other) along the internal wall of the body. The magnitude of this thrust is sufficient for at least some of the mass of loose pieces to continue their upward movement along the internal wall even when the movement of the blade has reversed. Upon the reversal of this movement, this portion of the mass of loose pieces basically performs a jump and the direction of this jump is "guided" by one or other of the arcuate elements (deflectors) 24 which cause it to fall towards the bottom of the tank 1 onto the rest of the mass.

In the second embodiment of the apparatus according to the present invention, shown in FIG. 2, the curved elements 24 are absent and the sides 3, 4 therefore have end portions 26 high enough to contain the mass of loose pieces which is tossed by the motion of the blade 22.

During this step of the process, as a result of being tossed and falling back, the loose pieces of the first, frozen component are gradually brought to a dispersed condition, that is, the mass is broken up. It is precisely in this condition that the second component can contact the entire surfaces of the individual frozen pieces.

The mass of loose pieces is subjected to the tossing and falling step throughout the time spent in the tank 1 so that, at the output, all of the pieces are in a dispersed condition.

The steps of the tossing, falling and continuous mixing by the blade 22 (in cooperation with the arcuate deflector elements 24) solve the technical problem upon which the invention is based.

The invention thus conceived may undergo many variations and modifications all falling within the scope of the inventive concept. Moreover, any materials and dimensions may be used, according to requirements, without thereby departing from the scope of protection of the invention as defined by the following claims.

I claim:

1. A method for the continuous production of a frozen, composite food product including at least two components, which method comprises the steps of:

freezing a first component of the composite product;

advancing a continuous flow of loose pieces of the first, frozen component of the composite product along a mixing tank towards an output end thereof, and tossing the pieces of the first frozen component which then fall back into the tank resulting in the simultaneous tossing and falling back into the tank of said pieces, wherein the pieces are in a dispersed condition as a result of being tossed and falling back into the tank, spreading on the pieces of first frozen component a continuous flow of at least one second component of the composite food product, the second component freezing upon contact with the individual pieces of the frozen first component.

2. A method according to claim 1, further comprising the supply of a refrigerant fluid into the tank to increase the rate of cooling of the second component upon contact with the pieces of the first, frozen component.

3. A method according to claim 2, in which the refrigerant fluid is liquid nitrogen.

4. A method according to claim 2, wherein the second component is supplied in at least two independent flows in at least two successive different positions in the mixing tank.

5. A method according to claim 2, in which the refrigerant fluid is powered dry ice.

* * * * *